(12) United States Patent
Urban et al.

(10) Patent No.: US 9,008,503 B2
(45) Date of Patent: Apr. 14, 2015

(54) SUPERVISION OF WAVELENGTH DIVISION MULTIPLEXED OPTICAL NETWORKS (75) Inventors: Patryk Urban, Vällingby (SE); Min Cen, Tournai (BE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 20 days.

(21) Appl. No.: 14/004,522

(22) PCT Filed: Mar. 21, 2011

(86) PCT No.: PCT/SE2011/050305
§ 371 (c)(1),
(2), (4) Date: Sep. 11, 2013

(87) PCT Pub. No.: WO2012/128677
PCT Pub. Date: Sep. 27, 2012

(65) Prior Publication Data
US 2014/0003806 A1 Jan. 2, 2014

(51) Int. Cl.
*H04B 17/00* (2006.01)
*H04B 10/071* (2013.01)
(Continued)

(52) U.S. Cl.
CPC ......... *H04B 10/071* (2013.01); *G01M 11/3127* (2013.01); *G01M 11/3136* (2013.01); *H04B 10/272* (2013.01); *H04J 14/0221* (2013.01); *H04J 14/0282* (2013.01)

(58) Field of Classification Search
CPC ... H04B 10/07; H04B 10/071; H04B 10/0705
USPC .......... 398/14, 17, 20, 21, 33, 34, 66, 79, 91, 398/82, 168, 170
See application file for complete search history.

(56) References Cited

U.S. PATENT DOCUMENTS 5,673,342 A * 9/1997 Nelson et al. .................. 385/24
5,790,285 A * 8/1998 Mock ............................. 398/21
(Continued)

FOREIGN PATENT DOCUMENTS

EP 0639782 A1 2/1995
WO 2011086400 A1 7/2011

OTHER PUBLICATIONS

Elecommunication Standardization Sector of ITU, "Gigabit-capable Passive Optical Networks (GPON): Physical Media Dependent (PMD) layer specification", Series G: Transmissions Systems and Media, Digital Systems and Networks, Digital sections and digital line system—Optical line systems for local and access networks, ITU-T Recommendation G.984.2, Mar. 1, 2003, pp. 1-38, ITU-T.
(Continued)

*Primary Examiner* — Dalzid Singh
(74) *Attorney, Agent, or Firm* — Coats & Bennett, PLLC (57) ABSTRACT

An arrangement in a node in a WDM-PON and a method therein for supervision of the WDM-PON are provided. The arrangement comprises X splitters of splitting ratio 1:Y, each splitter having one input and Y outputs such that X*Y equals N, wherein X, Y, N are integers. The one input of each of the X splitters is configured to receive an Optical Time Domain Reflectometry, OTDR, signal and to split the received OTDR signal into Y OTDR sub-signals such that a total of N OTDR sub-signals are outputted from the X splitters. The arrangement further comprises an N*N Arrayed Waveguide Grating, AWG, and a first filter configured to mix a feeder signal comprising data communication from an Optical Line Termination, OLT, with one of the N OTDR sub-signals. One input of the AWG is configured to receive the mix of the feeder signal and the one OTDR sub-signal, and the remaining N-inputs of the AWG are each configured to receive a respective one of the N-remaining OTDR sub-signals.

11 Claims, 7 Drawing Sheets

(51) Int. Cl.
   *G01M 11/00* (2006.01)
   *H04B 10/272* (2013.01)
   *H04J 14/02* (2006.01)

(56) References Cited

U.S. PATENT DOCUMENTS

| | | | |
|---|---|---|---|
| 6,534,997 B1* | 3/2003 | Horishita et al. | 324/534 |
| 2004/0196664 A1* | 10/2004 | Renard et al. | 362/551 |
| 2006/0222364 A1 | 10/2006 | Chung et al. | |
| 2008/0031624 A1 | 2/2008 | Smith et al. | |
| 2008/0062408 A1 | 3/2008 | Lai et al. | |
| 2008/0291431 A1 | 11/2008 | Wang et al. | |
| 2009/0263123 A1 | 10/2009 | Zhu et al. | |
| 2010/0150547 A1* | 6/2010 | Xia et al. | 398/13 |
| 2010/0316372 A1 | 12/2010 | Chang et al. | |
| 2012/0039598 A1 | 2/2012 | Dahlfort | |
| 2012/0163800 A1 | 6/2012 | Urban | |
| 2013/0259469 A1* | 10/2013 | Smith et al. | 398/16 |

OTHER PUBLICATIONS

Elecommunication Standardization Sector of ITU, "Optical fibre outside plant maintenance support, monitoring and testing system", Series L: Construction, Installation and Protection of Cable and Other Elements of Outside Plant, ITU-T Recommendation L.40, Oct. 1, 2000, pp. 1-42, ITU-T.

Elecommunication Standardization Sector of ITU, "Optical fibre cable maintenance criteria for in-service fibre testing in access networks", Series L: Construction, Installation and Protection of Cable and Other Elements of Outside Plant, ITU-T Recommendation L.66, May 1, 2007, pp. 1-20, ITU-T.

Elecommunication Standardization Sector of ITU, "Optical fibre maintenance criteria for access networks", Series L: Construction, Installation and Protection of Cable and Other Elements of Outside Plant, ITU-T Recommendation L.53, May 1, 2003, pp. 1-28, ITU-T.

Yuksel, K. et al., "Optical Layer Monitoring in Passive Optical Networks (PONs): A Review", 10th Anniversary International Conference on Transparent Optical Networks, 2008, ICTON 2008, Jun. 22, 2008, pp. 92-98, vol. 1, IEEE.

Kamei, S. et al., "NxN Cyclic-Frequency Router With Improved Performance Based on Arrayed-Waveguide Grating", Journal of Lightwave Technology, Sep. 15, 2009, pp. 4097-4104, vol. 27, Issue 18, IEEE Aerospace and Electronic Systems Society.

Hilmi, S., et al., "Scalable FTTH-PON architecture for unlimited user and flexible services", Proceedings article, The International Society for Optical Engineering—Network Architectures, Management, and Applications III, Dec. 5, 2005, pp. 1-7, vol. 6022.

Liaw, S., et al., "AWG-Based WDM-PON Monitoring System Using an Optical Switch and a WDM Filter", Lase Physics, Sep. 1, 2008, pp. 1052-1055, vol. 18, No. 9, Maik Nauka—Interperiodica Publishing, RU.

Urban, P., et al., "OTM- and OTDR-based cost-efficient Fiber Fault Identification and Localization in Passive Optical Network", Optical Fiber Communication Conference and Exposition (OFC/NFOEC), 2011 and the National Fiber Optic Engineers Conference, Mar. 6, 2011, pp. 1-3, paper JWA064, Optical Society of America, US.

* cited by examiner

SUPERVISION OF WAVELENGTH DIVISION MULTIPLEXED OPTICAL NETWORKS

TECHNICAL FIELD

Embodiments herein relate generally to supervision of Wavelength Multiplexed Optical Networks. Embodiments herein relate in particular to an arrangement in a node and a method therein for supervision of Wavelength Multiplexed Optical Networks.

BACKGROUND

A Passive Optical Network, PON, is a point-to-multipoint network architecture employing fibre cables from a central office to premises. One such PON is a Wavelength Division Multiplexed PON, WDM-PON.

It employs an Arrayed Waveguide Grating, AWG, to enable a single optical fibre to serve multiple premises. The AWG is used as an optical (de)multiplexer in the WDM-PON. The AWG is capable of multiplexing a large number of wavelengths into a single optical fibre, thereby increasing the transmission capacity of the network. A WDM-PON comprises an Optical Line Terminal, OLT, at the central office of the service provider. It comprises a number of Optical Network Terminals, ONTs, near end users. A WDM-PON configuration reduces the amount of fibre and central office equipment required compared with point-to-point architectures. A passive optical network is a form of fibre-optic access network.

A PON, such as a WDM-PON should be supervised and monitored in order to detect any possible occurring failure in the WDM-PON. No supervision results in that a failure in the WDM-PON is recorded only based on service provision drop-out, resulting in loss of revenue for the operator. In order to make PONS and also WDM-PONS attractive to the operators, by reducing their Operational Expenditures, it is important to develop cost-efficient, fully reliable and accurate monitoring solutions which support fault detection, identification and localization of a possible fault in different fibre-access topologies.

This is of particular importance in WDM-PONS because a single WDM-PON will most likely support a lot of bandwidth-demanding end users. One advantage of a WDM-PON is that can provide symmetric bandwidth per user or per wavelength of 1-10 Gbit/s at minimum. Reliability and short downtimes are crucial for the end users to experience good quality and for the operators not to suffer loss of revenues.

Preventive monitoring of a PON may provide information to an operator on foreseeable problems, e.g. a decrease of received power at an ONT, degradation or malfunction of a connector or splice, aging or bending of a fibre in the PON and so on. Thus preventive monitoring can help mitigate potential signal losses. Furthermore, in case of sudden malfunction, a monitoring system should be able to timely detect and localize faults. Remote and automatic monitoring contributes to Operational Expenditure savings as no technical crew has to be dispatched to the field until the moment when the failure is defined and localized.

Some requirements can be defined for a monitoring system. For example, monitoring should not influence regular data communication. In other words, the monitoring should be non-invasive. This is achievable by utilizing a dedicated optical bandwidth. Furthermore, the monitoring should be sensitive to relatively small power fluctuations detectable in on-demand mode or in periodic mode. On top of that, it should not require any high initial investment.

In order to supervise and monitor the performance of a PON, Optical Time-Domain Reflectometry, OTDR, can be used. An OTDR device injects a series of optical pulses into the fibre. The series of optical pulses, also called OTDR signals travel down the network towards the ONTs. Parts of the OTDR signals are reflected back towards the OTDR device. The back reflected, or backscattered, OTDR signal may be used for estimating the fibre's length and overall attenuation, including splitter losses. The backscattered OTDR signal may also be used to locate faults, such as breaks, and to measure optical return loss.

Most of the methods or techniques known today satisfy only some of the above requirements. Most the methods or techniques known today increase Capital Expenditures significantly since they require either tuneable or multi-wavelength OTDR. Tuneable or multi-wavelength OTDR requires larger bandwidth to accommodate multi OTDR channels. Some of the methods or techniques known today require advanced OLT transmitter upgrades which provide service-disruptive monitoring. Some other methods require significant optical distribution network upgrades due to the duplication of parts of the light paths. Furthermore, most the methods or techniques known today can only detect a fibre fault which introduces significant loss, far above the expected threshold of 1 dB. Still further, the majority of methods can only detect a fault and determine the faulty branch, i.e. the fibre from a remote node to an ONT, and they are not able to determine the exact location of the fault, e.g. the distance from the remote node.

SUMMARY

It is an object of the exemplifying embodiments to address at least some of the problems outlined above. In particular, it is an object of the exemplifying embodiments to provide an arrangement in a node in a WDM-PON and a method therein for supervision of the WDM-PON. These objects and others may be obtained by providing an arrangement in a node in a WDM-PON and a method therein according to the independent claims attached below.

According to an aspect, an arrangement in a Wavelength Division Multiplexed Passive Optical Network, WDM-PON, for supervision of the WDM-PON is provided. The arrangement comprises X splitters of splitting ratio 1:Y, each splitter having one input and Y outputs such that X*Y equals N, wherein X, Y, N are integers, wherein the one input of each of the X splitters is configured to receive an Optical Time Domain Reflectometry, OTDR, signal and to split the received OTDR signal into Y OTDR sub-signals such that a total of N OTDR sub-signals are outputted from the X splitters. The arrangement further comprises an N*N Arrayed Waveguide Grating, AWG, and a first filter configured to mix a feeder signal comprising data communication from an Optical Line Termination, OLT, with one of the N OTDR sub-signals. One input of the AWG is configured to receive the mix of the feeder signal and the one OTDR sub-signal, and the remaining N−1 inputs of the AWG are each configured to receive a respective one of the N−1 remaining OTDR sub-signals, thereby enabling supervision of the WDM-PON without influencing the data communication.

According to an embodiment, the arrangement further comprises a switch configured to receive the OTDR signal from an OTDR device, to switch the OTDR signal into X OTDR outputs and to insert each of the X OTDR output signals into the respective input of the X splitters of splitting ratio 1:Y.

According to an aspect, a method an arrangement in a Wavelength Division Multiplexed Passive Optical Network, WDM-PON, for supervision of the WDM-PON is provided. The method comprises receiving an Optical Time Domain Reflectometry, OTDR, signal from an OTDR device and splitting the OTDR signal into N OTDR sub-signals, N being an integer. The method further comprises receiving a feeder signal comprising data communication from an Optical Line Termination, OLT, and mixing the feeder signal with and one of the N OTDR sub-signals by a first filter. Still further, the method comprises inserting the mixed feeder signal and the N OTDR sub-signal to a first input of a N*N Arrayed Waveguide Grating, AWG, and inserting each of the remaining N−1 OTDR sub-signals to the respective remaining N−1 inputs of the AWG. This way, supervision of the WDM-PON without influencing data communication is enabled.

According to an embodiment, the splitting of the OTDR signal into N OTDR sub-signals comprises switching the received OTDR signal by a switch to X splitters of splitting ratio 1:Y, each splitter having one input and Y outputs such that X*Y equals N, wherein X, Y are integers, wherein each of the X splitters receives the OTDR signal and splits the OTDR signal into Y OTDR sub-signals such that the total of N OTDR sub-signals are outputted from the X splitters.

The arrangement and the method therein have several advantages. It provides a time and cost efficient comprehensive centralized monitoring activity without influencing data communication or having to upgrade drop links and which support, in principle, any PON system. Its costs are shared over a number of OLTs. It is further a bandwidth-efficient solution since a single wavelength is used to provide monitoring of a number of drop links in the WDM-PONS. It further provides high accuracy and fault detection sensitivity limited only by the performance of the applied OTDR. It may further reduce service provisioning downtime and maintenance costs.

BRIEF DESCRIPTION OF DRAWINGS

Embodiments will now be described in more detail in relation to the accompanying drawings, in which.

DETAILED DESCRIPTION

Briefly described, an arrangement in a node in a WDM-PON and a method in a node in a WDM-PON for supervision of the WDM-PON are provided. The supervision of the WDM-PON makes use of OTDR signals being send from an OTDR device, through the WDM-PON towards Optical Network Terminals, ONTs.

Figure 1:
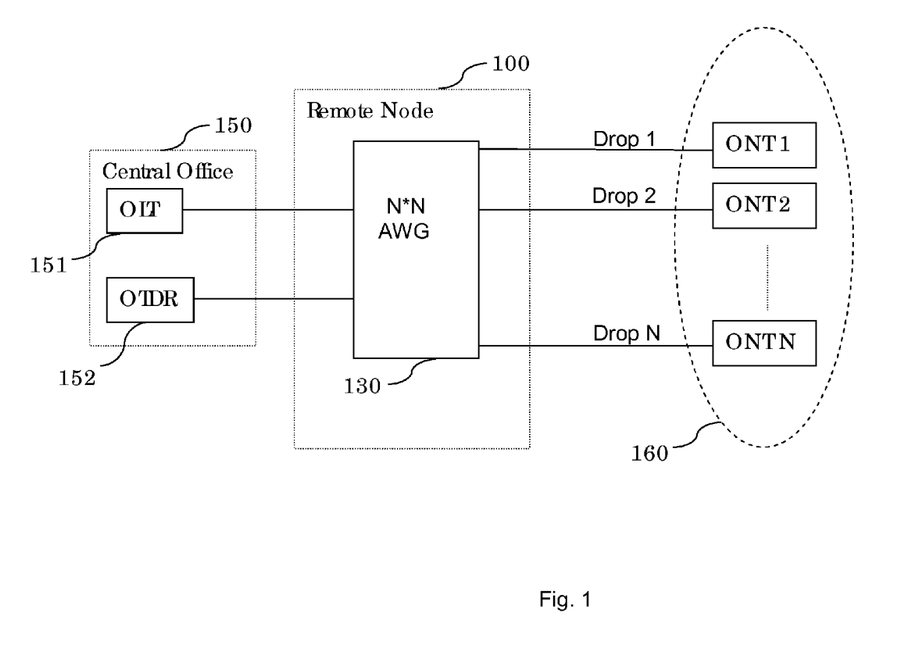
FIG. 1 is a simplified schematic block diagram of a WDM-PON also having an OTDR device for supervision of the WDM-PON.

FIG. 1 is a simplified schematic block diagram of a WDM-PON also having an OTDR device for supervision of the WDM-PON.

The WDM-PON comprises a central office 150 in which an OLT 151 is located. The OLT 151 sends optical pulses comprising N different wavelengths in a feeder fibre towards an N*N AWG 130 located in a remote node 100. The central office also houses and OTDR device 152 which sends a monitoring optical pulse of a certain wavelength towards the N*N AWG 130 in the remote node 100. The AWG 130 separates the N different wavelengths received by the feeder fibre and sends each wavelength in a respective fibre, also called a drop link, towards N different ONTs 160.

Figure 2:
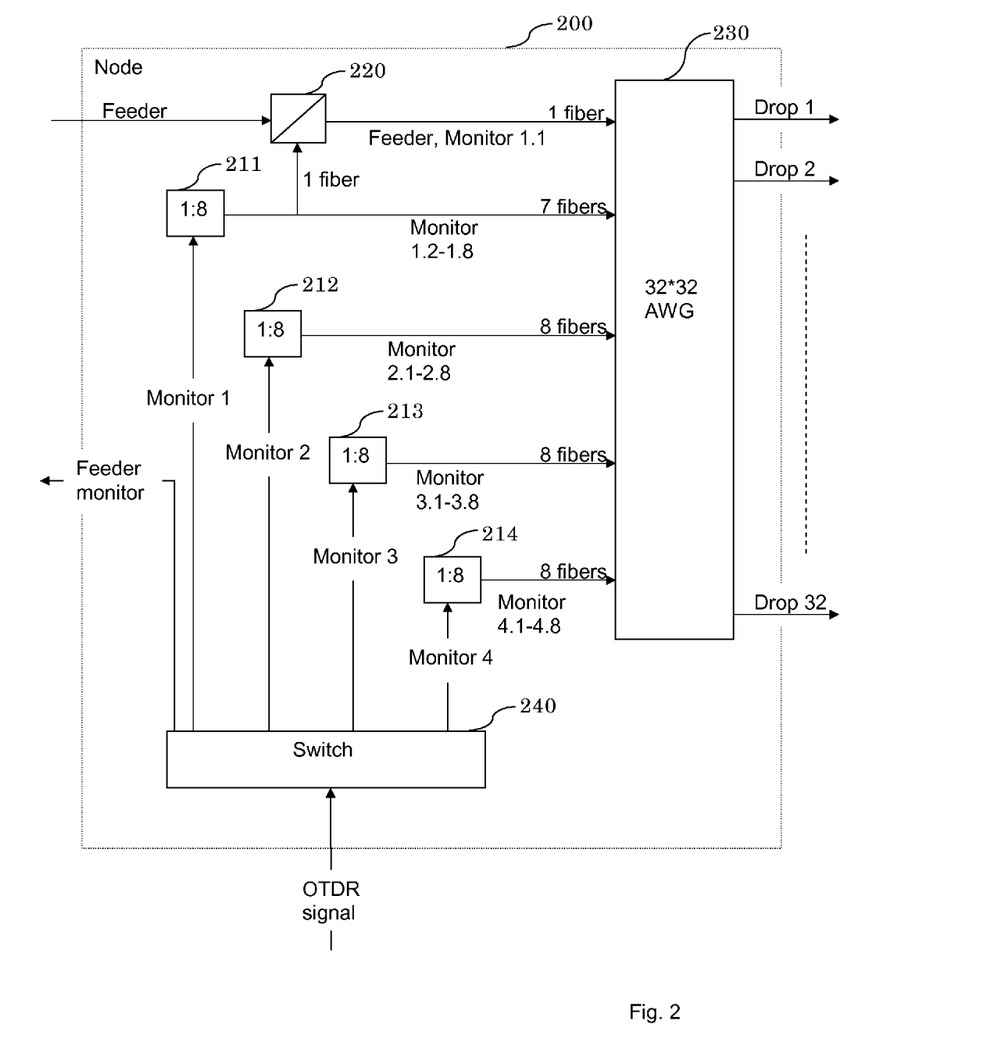
FIG. 2 is a schematic block diagram of an exemplifying embodiment of an arrangement in a node in a Wavelength Division Multiplexed Passive Optical Network, WDM-PON, for supervision of the WDM-PON.

FIG. 2 is a schematic block diagram of an exemplifying embodiment of an arrangement in a node in a WDM-PON for supervision of the WDM-PON.

In this exemplifying embodiment, N=32 such that the AWG is a 32*32 AWG and the WDM-PON comprises 32 ONTs connected to the AWG by respective 32 drop links, drop 1, drop 2 and so on until drop 32. It shall be noticed that other values of N are possible.

The arrangement in a node 200 in the WDM-PON for supervision of the WDM-PON comprises four splitters 211-214 of splitting ratio 1:8, each splitter having one input and eight outputs such that the number of splitters multiplied by the splitting ratio equals N. In this example, there are four splitters each splitting an input into eight outputs, i.e. 4*8=32. The one input of each of the four splitters is configured to receive an OTDR signal and to split the received OTDR signal into eight OTDR sub-signals such that a total of 32 OTDR sub-signals are outputted from the four splitters.

To generalize, the arrangement comprises X splitters (211-214) of splitting ratio 1:Y, each splitter having one input and Y outputs such that X*Y equals N.

The arrangement further comprises a 32*32 AWG 230 and a first filter 220 configured to mix a feeder signal comprising data communication from an OLT 151 with one of the 32 OTDR sub-signals.

Further, one input of the AWG 230 is configured to receive the mix of the feeder signal and the one OTDR sub-signal, and the remaining 32−1=31 inputs of the AWG are each configured to receive a respective one of the 32−1=31 remaining OTDR sub-signals, thereby enabling supervision of the WDM-PON without influencing the data communication.

The feeder signal that is inputted into the filer 220 comprises N different wavelengths, in this example 32 different wavelengths. The AWG 230 is arranged to separate the 32 different wavelengths and to output each respective wavelength into a respective drop link. Further, the AWG 230 is arranged to output the 32 inputted OTDR sub-signals to a respective output so that each drop link comprises an optical feeder signal of a certain wavelength carrying data information and an OTDR sub-signal.

This arrangement has several advantages. It provides a time and cost efficient comprehensive centralized monitoring activity without influencing data communication or having to upgrade drop links and which support, in principle, any PON system. Its costs are shared over a number of OLTs. It is further a bandwidth-efficient solution since a single wavelength is used to provide monitoring of a number of drop links in the WDM-PONS. It further provides high accuracy and fault detection sensitivity limited only by the performance of the applied OTDR. It may further reduce service provisioning downtime and maintenance costs.

FIG. 2 further illustrates the arrangement further comprising an optical switch 240 configured to receive the OTDR signal from an OTDR device 152, to switch the OTDR signal into four OTDR outputs and to insert each of the four OTDR output signals into the respective input of the four splitters of splitting ratio 1:8.

The optical switch 240 may preferably be an ultra low cost optical switch capable of switching the input OTDR signal to at least the, in this example four, splitters.

Further, FIG. 2 illustrates the OTDR signal being received by the switch 240. The switch 240 switches the signal to the four switches 211-214. This is illustrated by the arrows "Monitor 1" to "Monitor 4". FIG. 2 also illustrates the switch 240 switching the inputted or received OTDR signal to an additional "Feeder monitor", however, this will be explained later.

The first signal, "Monitor 1" which is the OTDR signal, is inputted to the first splitter 211. The splitter 211 splits the OTDR signal into eight OTDR sub-signals. One output of the first splitter 211 is inputted to the filter 220. The filter 220 also receives the feeder signal comprising the 32 different wavelengths and the filter 220 mixes the feeder signal with the OTDR sub-signal and outputs the mixed signal to one input of the AWG 230, illustrated by "Feeder, Monitor 1.1". Monitor 1.1 represents splitter 1 and output 1. Seven of the outputs of splitter 211 are inputted into respective seven inputs of the AWG 230, illustrated by "Monitor 1.2-1.8". Monitor 1.2-1.8 represents splitter 1 and outputs 2-8.

The second signal, "Monitor 2" which is the OTDR signal, is inputted to the second splitter 212. The splitter 212 splits the OTDR signal into eight OTDR sub-signals. The eight outputs of the second splitter 212 are inputted into respective eight inputs of the AWG 230, illustrated by "Monitor 2.1-2.8". Monitor 2.1-2.8 represents splitter 2 and outputs 8-8. Likewise for the third and fourth signals "Monitor 3" and "Monitor 4" and the third and fourth splitters 213 and 214.

Figure 3:
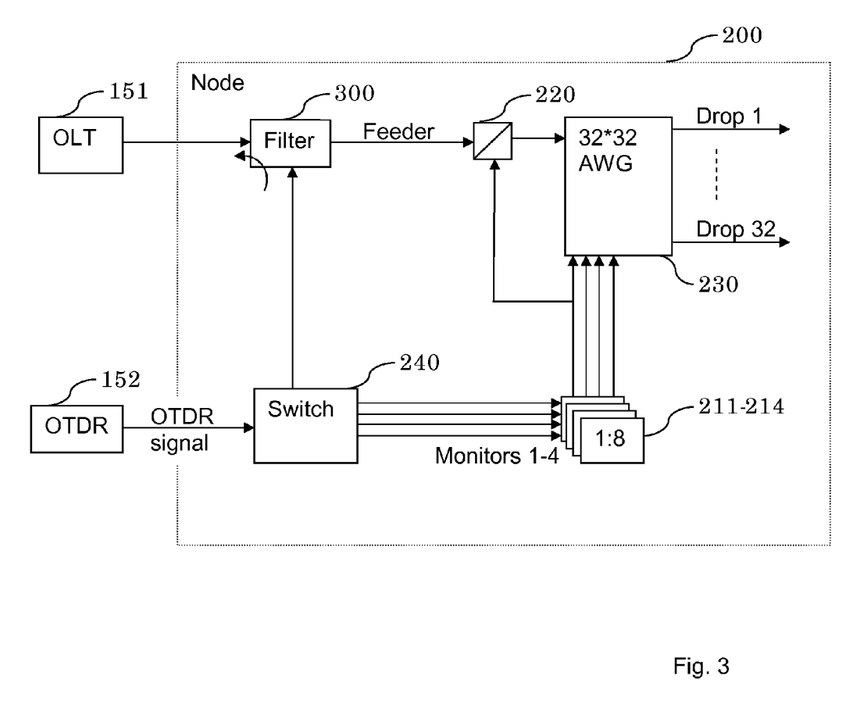
FIG. 3 is a schematic block diagram of yet an exemplifying embodiment of an arrangement in a node in a WDM-PON for supervision of the WDM-PON.

FIG. 3 is a schematic block diagram of an exemplifying embodiment of an arrangement in a node in a WDM-PON for supervision of the WDM-PON.

FIG. 3 illustrates the arrangement further comprising a second filter 300 configured to receive the feeder signal from the OLT 151, wherein the switch 240 is configured to further switch the received OTDR signal from an OTDR device 152 such that an OTDR signal is inserted into the second filter 300 The second filter 300 is configured to transmit the OTDR signal to the OLT, thereby enabling supervision of a feeder fibre between the OLT and the second filter.

Comparing FIG. 3 and FIG. 2, the "feeder monitor" of FIG. 2 corresponds to the arrow between the switch 240 and the filter 300 in FIG. 3. This embodiment enables supervision of the feeder fibre between the OLT 151 and the filter 300. In case of failure in the feeder fibre between the OLT 151 and the filter 300, this will cause backscattering of the OTDR signal which will be detected by the OTDR device 152. In this embodiment, the switch 240 is arranged to switch the incoming or received OTDR signal both to the four splitters 211-214 and to the filter 300.

Figure 4:
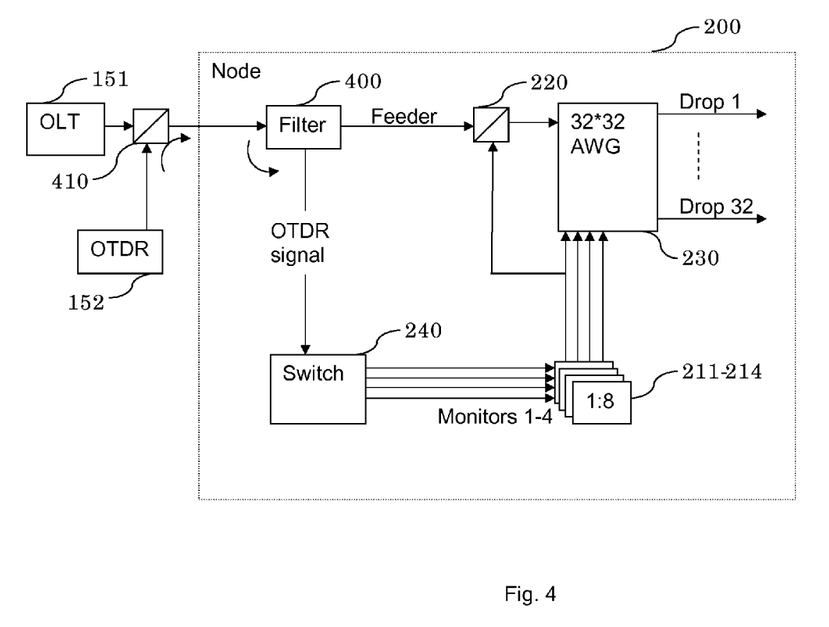
FIG. 4 is a schematic block diagram of still an exemplifying embodiment of an arrangement in a node in a WDM-PON for supervision of the WDM-PON.

FIG. 4 is a schematic block diagram of an exemplifying embodiment of an arrangement in a node in a WDM-PON for supervision of the WDM-PON.

FIG. 4 illustrates the arrangement comprising a third filter 400 configured to receive the OTDR signal together with feeder signal and to separate the OTDR signal from the feeder signal and to supply the OTDR signal to the switch 240 and the feeder signal to the first filter 220.

In this embodiment, there is no extra dedicated fibre available for the OTDR device 152 as was illustrated in FIGS. 1 and 3. Instead the OTDR signal must be sent on the same feeder fibre used by the OLT. In such an embodiment, the feeder signal carrying the data information and the OTDR signal are mixed together. This may for example be dome by means of a filter 410.

As the mixed feeder signal and OTDR signal is received in the node, it is received by a filter 400. The filter 400 is arranged to separate the feeder signal and the OTDR signal such that the feeder signal is provided to the filter 220 and the OTDR signal is provided to the switch 240. The filter 220 is the same as in the previous embodiments and the switch 240 is arranged to switch the received OTDR signal to the four splitters 211-214. The four splitters 211-214 in this embodiment are the same as the splitters as in previous embodiment.

Again it shall be pointed out that all the exemplifying embodiments disclose four splitters of splitting ratio 1:8 and a 32*32 AWG. This is merely an example and other types of AWGs may be used as well as splitters of other splitting ratios and different number of splitters can be used. Merely as an example, a 128*128 AWG can be used together with sixteen splitters of ratio 1:8, or a 128*128 AWG together with eight splitters of ratio 1:16.

According to an exemplifying embodiment, again with N=32, the feeder signal comprises 32 wavelengths, $\lambda_1$, $\lambda_2$, . . . , $\lambda_{32}$, and the OTDR signal has a wavelength of $\lambda_1^i + n*FSR$, where FSR is a Free Spectral Range of the AWG, i is an integer from 1 to 32 and n is an integer value.

The value of i depends on which input of the AWG the OTDR signal is inserted. In the example illustrated in FIG. 2, the feeder signal and one of the OTDR sub-signals are inserted or provided to the first input of the AWG. The OTDR signal inputted at the first port of the AWG has a wavelength of $\lambda_1^1 + n*FSR$ and the OTDR signal inputted at the second port of the AWG has a wavelength of $\lambda_1^2 + n*FSR$, and so on, where FSR is a Free Spectral Range of the AWG and n is an integer value. The superscript indicates the port and the subscript indicates the wavelength.

Figure 5:
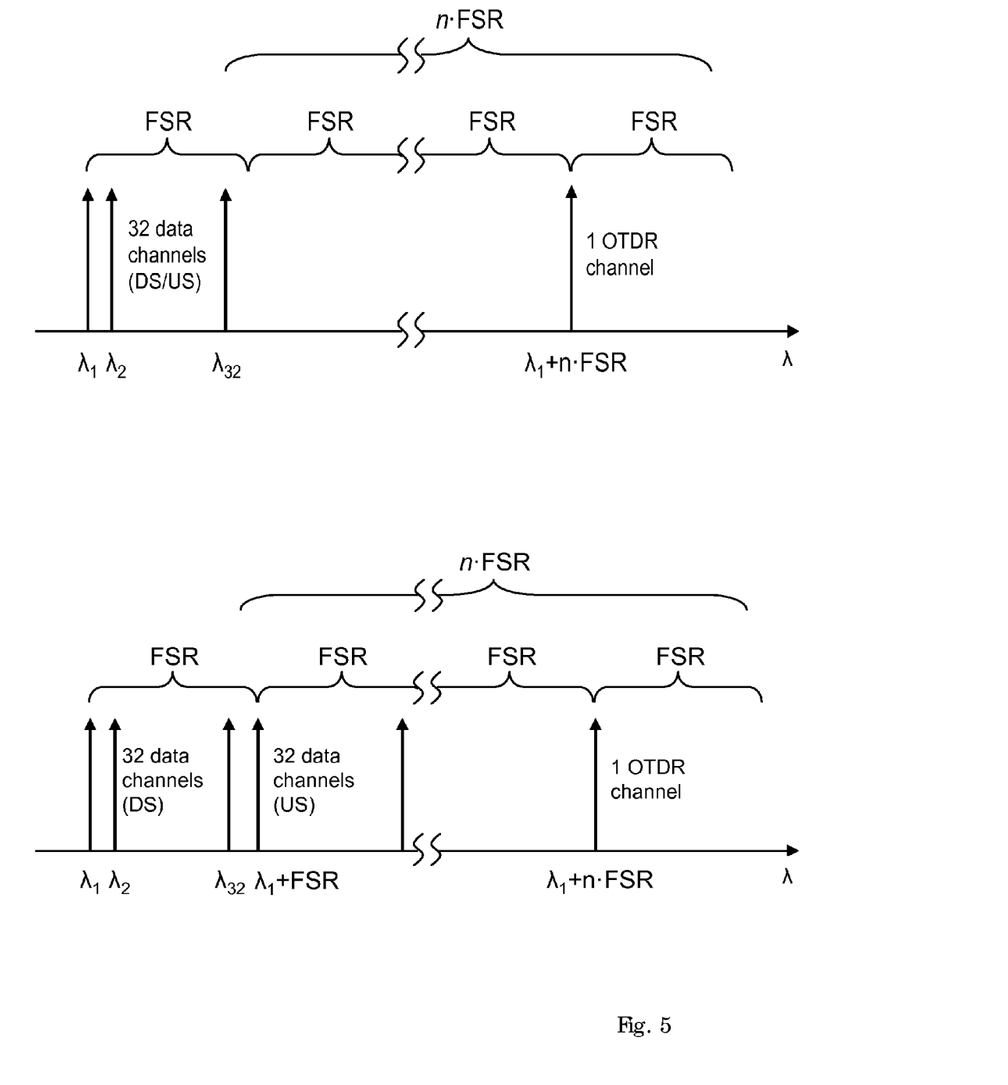
FIG. 5 is an illustration of different wavelengths being inputted into an AWG, the input comprising a feeder signal and an OTDR signal.

The value of n depends on the exact data wavelength-channels. There are two basic possibilities: single wavelength bidirectional transmission or single wavelength unidirectional transmission. The single wavelength bidirectional transmission requires e.g. remodulation technique at the ONT, whereas the I single wavelength unidirectional transmission requires two wavelengths for bidirectional transmission, e.g. remote Continuous Wavelength seeding. Both approaches can be supported and example of wavelength choices is given in FIG. 5 (top) and FIG. 5 (bottom), respectively.

Figure 6:
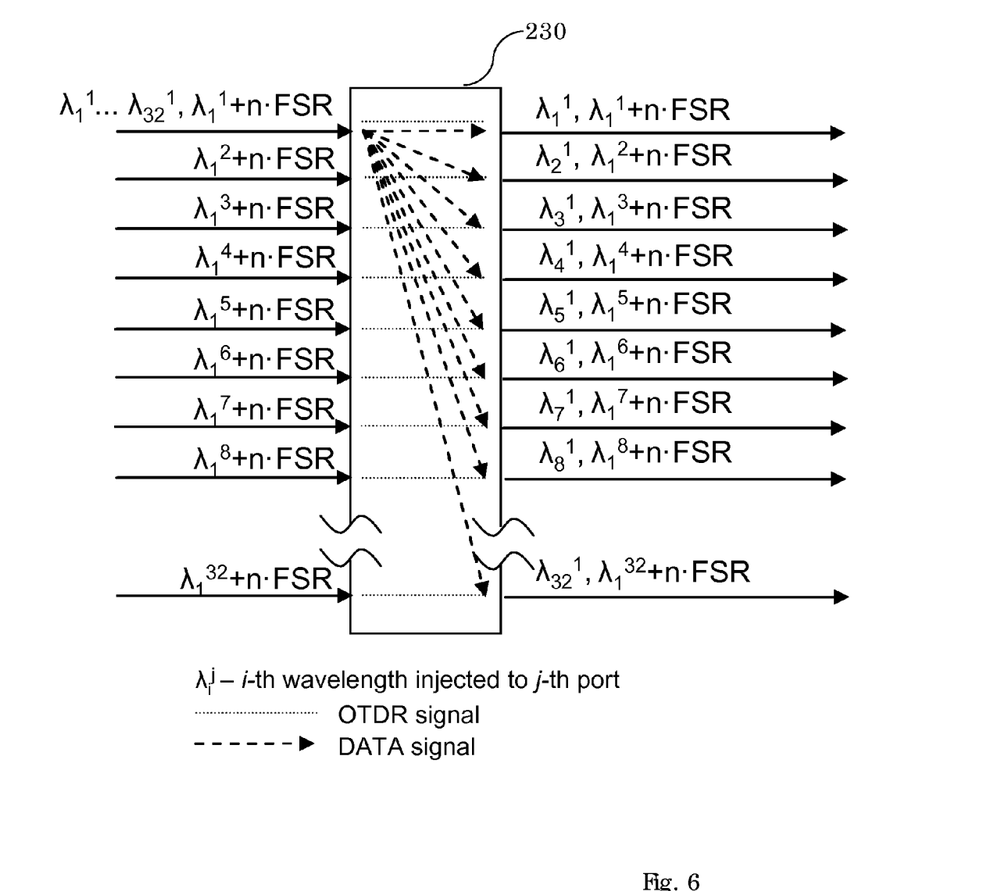
FIG. 6 is a schematic illustration the function of an AWG.

FIG. 6 is a schematic illustration the function of an AWG and it illustrates now the OTDR signal, also called the OTDR channel wavelength is directed within the N*N AWG. In this example, N is again 32.

The first input of the AWG 230 is provided with a mix of the feeder signal and the OTDR sub-signal. The feeder signal is carrying the data information and comprises N=32 different wavelengths $\lambda_1, \lambda_2, \ldots, \lambda_{32}$. This is illustrated in FIG. 6 by $\lambda_1^1 \ldots \lambda_{32}^1$. The subscripts 1-32 denote the different wavelengths that are comprised in the feeder signal and the superscripts 1 denote the first input or input port 1. Input port 1 is also provided with the OTDR sub-signal illustrated by $\lambda_1^1 + n*FSR$, where the subscript 1 denotes the "base" wavelength of the OTDR sub-signal and the superscript 1 denotes the first input port of the AWG. The remaining 31 (N−1) input ports of the AWG 230 are provided with an OTDR sub-signal illustrated by $\lambda_1^2 + n*FSR$, $\lambda_1^3 + n*FSR$, to $\lambda_1^{32} + n*FSR$. This means that all the OTDR sub-signals have the same wavelengths since the subscripts are all 1 indicating the identical "base" wavelength so that the wavelength of all the OTDR sub-signals is $\lambda_1$+n*FSR. The superscripts 2-32 indicate the respective input ports of the AWG 230.

FIG. 6 illustrates the feeder signal, $\lambda_1^1 \ldots \lambda_{32}^1$, is separated in the AWG 230 such that the first output, or first output port, provides a signal which is sent to a first ONT (compare with FIG. 1), which comprises the first wavelength of the feeder signal $\lambda_1^1$ and the OTDR sub-signal $\lambda_1^1$+n*FSR being inputted at the first input port.

The second output port of the AWG 230 provides a signal which is sent to a second ONT (compare with FIG. 1), which comprises the second wavelength of the feeder signal $\lambda_2^1$ and the OTDR sub-signal $\lambda_1^2$+n*FSR being inputted at the second input port. Likewise for all the wavelengths in the feeder signal such that the thirty-second wavelength of the feeder signal $\lambda_{32}^1$ is outputted at the thirty-second output port together with the OTDR sub-signal $\lambda_1^{32}$+n*FSR being inputted at the thirty-second input port.

The AWG can be organized in a single, integrated module with only a fractional increase of cost per ONT. The complete node does not introduce any significant additional loss to the data channels if neglecting the fractional insertion loss of the two filters 220+300 or 220+400 in the feeder (~1 dB if integrated). On the other hand, if the 1:8 splitters are not integrated it leaves the possibility to upgrade the monitoring system (not interrupting the data transmission) with low split-ratio splitters in case of long-reach WDM-PON where OTDR signal power can be limited by long fibre attenuation.

The OTDR technique may advantageously be combined with Optical Transceiver Monitoring, OTM. The OTM provides some measurable parameters, e.g. transmit and receive power at the OLT and the ONTs. The OTM parameters can be queried from ONTs and collected from the OLT(s) by a centralized control unit which also can control the OTDR and the optical switch 240, see FIGS. 2-4.

Combined OTDR and OTM techniques enable measurement of transmit and receive optical power levels, discrete and cumulative losses as well as reflectances or backscattered light. Analysis of those gives a complete picture on all the ODN possible failures that may happen between the OLT and ONT.

An OTDR pulsed signal is sent from central office, CO, towards ONTs and backscattered to the CO. The OTDR signal is injected into the feeder fibre (see FIG. 4) or a dedicated fibre (see FIG. 3) and further through the optical switch 240 and dedicated splitters 211-244 constituting monitor ports at the node 200. The returned power is detected by a sensitive receiver in the OTDR device 152 and the information on its power is matched together with the information on time of the send-out and receive instances and plotted on an OTDR loss-distance trace. This OTDR measurement is performed periodically or on-demand. The latter mode is triggered manually or automatically as soon as an OTM alarm on low received optical power is obtained. Once the backscattered signal is received and the analysis of the OTDR trace is performed, information on OTDR-event type and magnitude is obtained. Such events are compared with reference data and if violation threshold is reached the OTDR results are mapped with OTM reports. Further on, faulty drop links are marked and the complete localization, including the distance from the node 200, is reported together with assigned type and magnitude of the faults. The measured data are stored in a database and they can be referred to anytime.

According to an embodiment, an arrangement in a WDM-PON for supervision of the WDM-PON is provided, wherein the arrangement comprising a node 200 as described above and an OTDR device 152, wherein the OTDR device 152 is arranged to supply the OTDR signal to the node, wherein the OTDR signal has a wavelength of $\lambda_1$+n*FSR, where FSR is a Free Spectral Range of the AWG and n is an integer value and $\lambda_1$ corresponds to a wavelength in feeder signal comprising data communication from the OLT.

Figure 7:
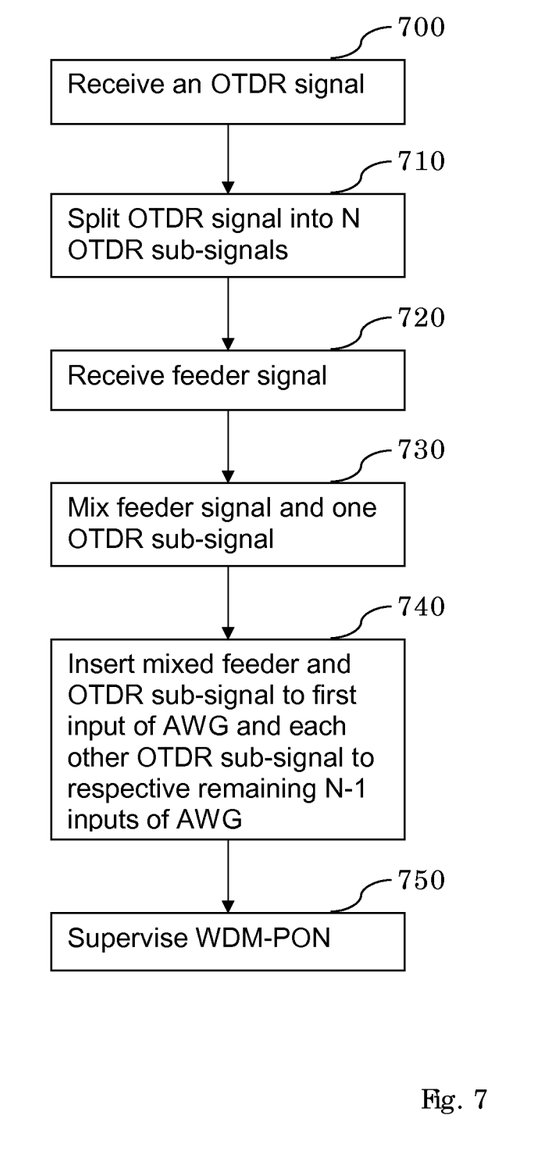
FIG. 7 is a flowchart of a method in a node in a WDM-PON for supervision of the WDM-PON.

FIG. 7 is a flowchart of a method in a node in a WDM-PON for supervision of the WDM-PON.

The method has the same objects and advantages as the arrangement in a node as discussed above. Therefore, the method will only be briefly described in order to avoid unnecessary repetition.

FIG. 7 illustrates the method comprising receiving 700 an OTDR signal from an OTDR device and splitting 710 the OTDR signal into N OTDR sub-signals, N being an integer. The method further comprises receiving 720 a feeder signal comprising data communication from an OLT and mixing 730 the feeder signal with and one of the N OTDR sub-signals by a first filter. The method also comprises inserting 740 the mixed feeder signal and the N OTDR sub-signal to a first input of a N*N Arrayed Waveguide Grating, AWG, and inserting each of the remaining N−1 OTDR sub-signals to the respective remaining N−1 inputs of the AWG. This way, supervision 750 of the WDM-PON without influencing data communication is enabled.

According to an embodiment, the splitting of the OTDR signal into N OTDR sub-signals comprises switching the received OTDR signal by a switch to X splitters of splitting ratio 1:Y, each splitter having one input and Y outputs such that X*Y equals N, wherein X, Y are integers, wherein each of the X splitters receives the OTDR signal and splits the OTDR signal into Y OTDR sub-signals such that the total of N OTDR sub-signals are outputted from the X splitters.

According to yet an embodiment, the received OTDR signal is further switched by the switch to a second filter in order to insert the OTDR signal into a feeder fibre between the filter and the OLT in order to supervise the feeder fibre between the OLT and the second filter.

According to still an embodiment, the OTDR signal and the feeder signal are received by a third filter, which separates the OTDR signal and the feeder signal and supplies the OTDR signal to the switch and the feeder signal to the first filter.

Still further, according to an embodiment, the feeder signal comprises N wavelengths, $\lambda_1, \lambda_2, \ldots, \lambda_N$, and the OTDR signal has a wavelength of $\lambda_1^i$+n*FSR, where FSR is a Free Spectral Range of the AWG, i is an integer from 1 to N and n is an integer value.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. An arrangement in a node in a Wavelength Division Multiplexed Passive Optical Network (WDM-PON) for supervision of the WDM-PON, the arrangement comprising:
   X splitters each having a splitting ratio of 1:Y, each splitter having one input and Y outputs such that X*Y equals N, wherein:
   X, Y, and N are integers;
   the one input of each of the X splitters is configured to receive an Optical Time Domain Reflectometry (OTDR) signal; and each of the X splitters is configured to split the received OTDR signal into Y OTDR sub-signals such that a total of N OTDR sub-signals are output from the X splitters;

an N*N Arrayed Waveguide Grating (AWG); and a first filter configured to mix a feeder signal comprising data communication from an Optical Line Termination (OLT) with one of the N OTDR sub-signals;

wherein one input of the AWG is configured to receive the mix of the feeder signal and the one OTDR sub-signal, and the remaining N−1 inputs of the AWG are each configured to receive a respective one of the N−1 remaining OTDR sub-signals, thereby enabling supervision of the WDM-PON without influencing the data communication.

2. The arrangement according to claim 1, further comprising a switch configured to:

receive the OTDR signal from an OTDR device; and switch the OTDR signal into X OTDR output signals to insert each of the X OTDR output signals into the respective input of the X splitters.

3. The arrangement according to claim 2, further comprising a second filter configured to receive the feeder signal from the OLT, wherein the switch is configured to further switch the received OTDR signal from the OTDR device such that the OTDR signal is inserted into the second filter, and wherein the second filter is configured to transmit the OTDR signal to the OLT, thereby enabling supervision of a feeder fiber between the OLT and the second filter.

4. The arrangement according to claim 2, further comprising a third filter configured to:

receive the OTDR signal together with the feeder signal;

separate the OTDR signal from the feeder signal; and supply the OTDR signal to the switch and the feeder signal to the first filter.

5. The arrangement according to claim 1, wherein the feeder signal comprises N wavelengths, $\lambda_1, \lambda_2, \ldots \lambda_N$, and the OTDR signal has a wavelength of $\lambda_1{}^i+\text{nFSR}$, where FSR represents a Free Spectral Range of the AWG, i represents an integer from 1 to N, and n represents an integer value.

6. An arrangement in a Wavelength Division Multiplexed Passive Optical Network (WDM-PON) for supervision of the WDM-PON, the arrangement comprising:

a node comprising:

X splitters each having a splitting ratio of 1:Y, each splitter having one input and Y outputs such that X*Y equals N, wherein:

X, Y, and N are integers;

the one input of each of the X splitters is configured to receive an Optical Time Domain Reflectometry (OTDR) signal; and each of the X splitters is configured to split the received OTDR signal into Y OTDR sub-signals such that a total of N OTDR sub-signals are output from the X splitters;

an N*N Arrayed Waveguide Grating (AWG); and a first filter configured to mix a feeder signal comprising data communication from an Optical Line Termination (OLT) with one of the N OTDR sub-signals;

wherein one input of the AWG is configured to receive the mix of the feeder signal and the one OTDR sub-signal, and the remaining N−1 inputs of the AWG are each configured to receive a respective one of the N−1 remaining OTDR sub-signals, thereby enabling supervision of the WDM-PON without influencing the data communication; and an OTDR device;

wherein the OTDR device is configured to supply the OTDR signal to the node;

wherein the OTDR signal has a wavelength of $\lambda_1+\text{nFSR}$, where FSR represents a Free Spectral Range of the AWG, n is an integer value, and $\lambda_1$ corresponds to a wavelength in the feeder signal comprising data communication from the OLT.

7. A method implemented in a node in a Wavelength Division Multiplexed Passive Optical Network (WDM-PON) for supervision of the WDM-PON, the method comprising:

receiving an Optical Time Domain Reflectometry (OTDR) signal from an OTDR device;

splitting the OTDR signal into N OTDR sub-signals, N being an integer;

receiving a feeder signal comprising data communication from an Optical Line Termination (OLT);

mixing the feeder signal with one of the N OTDR sub-signals by a first filter; and inserting the mixed feeder signal and the N OTDR sub-signal to a first input of an N*N Arrayed Waveguide Grating (AWG), and inserting each of the remaining N−1 OTDR sub-signals to the respective remaining N−1 inputs of the AWG, thereby enabling supervision of the WDM-PON without influencing data communication.

8. The method according to claim 7, wherein:

the splitting of the OTDR signal into N OTDR sub-signals comprises switching the received OTDR signal by a switch to X splitters having a splitting ratio of 1:Y, each splitter having one input and Y outputs such that X*Y equals N;

X and Y are integers; and each of the X splitters receives the OTDR signal and splits the OTDR signal into Y OTDR sub-signals such that the total of N OTDR sub-signals are output from the X splitters.

9. The method according to claim 8, further comprising switching the received OTDR signal by the switch to a second filter in order to insert the OTDR signal into a feeder fiber between the second filter and the OLT in order to supervise the feeder fiber between the OLT and the second filter.

10. The method according to claim 8, wherein the OTDR signal and the feeder signal are received by a third filter, which separates the OTDR signal and the feeder signal and supplies the OTDR signal to the switch and the feeder signal to the first filter.

11. The method according to claim 7, wherein the feeder signal comprises N wavelengths, $\lambda_1, \lambda_2, \ldots \lambda_N$, and the OTDR signal has a wavelength of $\lambda_1{}^i+\text{nFSR}$, where FSR represents a Free Spectral Range of the AWG, i is an integer from 1 to N, and n is an integer value.

* * * * *

UNITED STATES PATENT AND TRADEMARK OFFICE
CERTIFICATE OF CORRECTION

| | | |
|---|---|---|
| PATENT NO. | : 9,008,503 B2 | Page 1 of 1 |
| APPLICATION NO. | : 14/004522 | |
| DATED | : April 14, 2015 | |
| INVENTOR(S) | : Urban et al. | |

It is certified that error appears in the above-identified patent and that said Letters Patent is hereby corrected as shown below:

In the Specification

In Column 4, Line 48, delete "filer 220" and insert -- filter 220 --, therefor.

In Column 5, Line 12, delete "switches 211-214." and insert -- splitters 211-214. --, therefor.

Signed and Sealed this
First Day of September, 2015

Michelle K. Lee
*Director of the United States Patent and Trademark Office*